(12) United States Patent
Taylor

(10) Patent No.: US 6,880,568 B1
(45) Date of Patent: Apr. 19, 2005

(54) PRESSURE RELIEF SYSTEM WITH MULTI-PORT VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 220 days.

(21) Appl. No.: 10/214,218

(22) Filed: Aug. 7, 2002

(51) Int. Cl.[7] ............... F16K 17/40; F16K 31/12
(52) U.S. Cl. ............... 137/488; 137/70; 251/58
(58) Field of Search ............... 137/68.11, 70, 137/71, 488, 492, 492.5; 251/58

(56) References Cited

U.S. PATENT DOCUMENTS

| | | | | |
|---|---|---|---|---|
| 310,031 | A | * 12/1884 | Castelnau et al. | 137/494 |
| 2,082,940 | A | * 6/1937 | Brisbane et al. | 137/488 |
| 2,296,568 | A | * 9/1942 | Peacock | 137/488 |
| 3,542,052 | A | 11/1970 | Irwin | |
| 3,730,214 | A | * 5/1973 | Brumm | 137/488 |
| 4,564,169 | A | * 1/1986 | Nordlund | 251/58 |
| 4,724,857 | A | 2/1988 | Taylor | |
| 4,949,936 | A | * 8/1990 | Messina | 251/58 |
| 5,067,511 | A | 11/1991 | Taylor | |
| 5,146,942 | A | 9/1992 | Taylor | |
| 5,297,575 | A | 3/1994 | Taylor | |
| 5,318,060 | A | 6/1994 | Taylor | |
| 5,325,888 | A | * 7/1994 | Stary | 251/58 |
| 5,433,239 | A | 7/1995 | Taylor | |
| 5,462,086 | A | 10/1995 | Taylor et al. | |
| 5,575,306 | A | 11/1996 | Taylor | |
| 5,685,329 | A | 11/1997 | Taylor | |
| 5,860,442 | A | * 1/1999 | Taylor | 137/68.11 |
| 6,155,284 | A | 12/2000 | Scantlin | |
| 6,189,563 | B1 | * 2/2001 | Taylor | 137/487.5 |
| 6,325,088 | B1 | 12/2001 | Scantlin | |

FOREIGN PATENT DOCUMENTS

| | | |
|---|---|---|
| GB | 2196096 A | 4/1988 |
| GB | 2247300 A | 2/1992 |

* cited by examiner

*Primary Examiner*—John Rivell
(74) *Attorney, Agent, or Firm*—Fellers, Snider, et al.

(57) ABSTRACT

A pressure relief system is provided to detect and abate an overpressure condition in a pressurized fluid disposed in a conduit. The system includes a valve assembly and an actuator configured to actuate the valve assembly to establish an overpressure path for the pressurized fluid. The system further includes a piston assembly coupled to the conduit, a pressure responsive member (preferably a collapsible buckling pin) configured to mechanically fail when an axially directed compressive force exceeds a threshold level, and a multi-port, two-position valve disposed between the piston assembly and the pressure responsive member. The multi-port, two-position valve includes a spool that moves from a first position to a second position upon failure of the pressure responsive member, thereby directing control fluid through the spool to the actuator assembly.

20 Claims, 11 Drawing Sheets

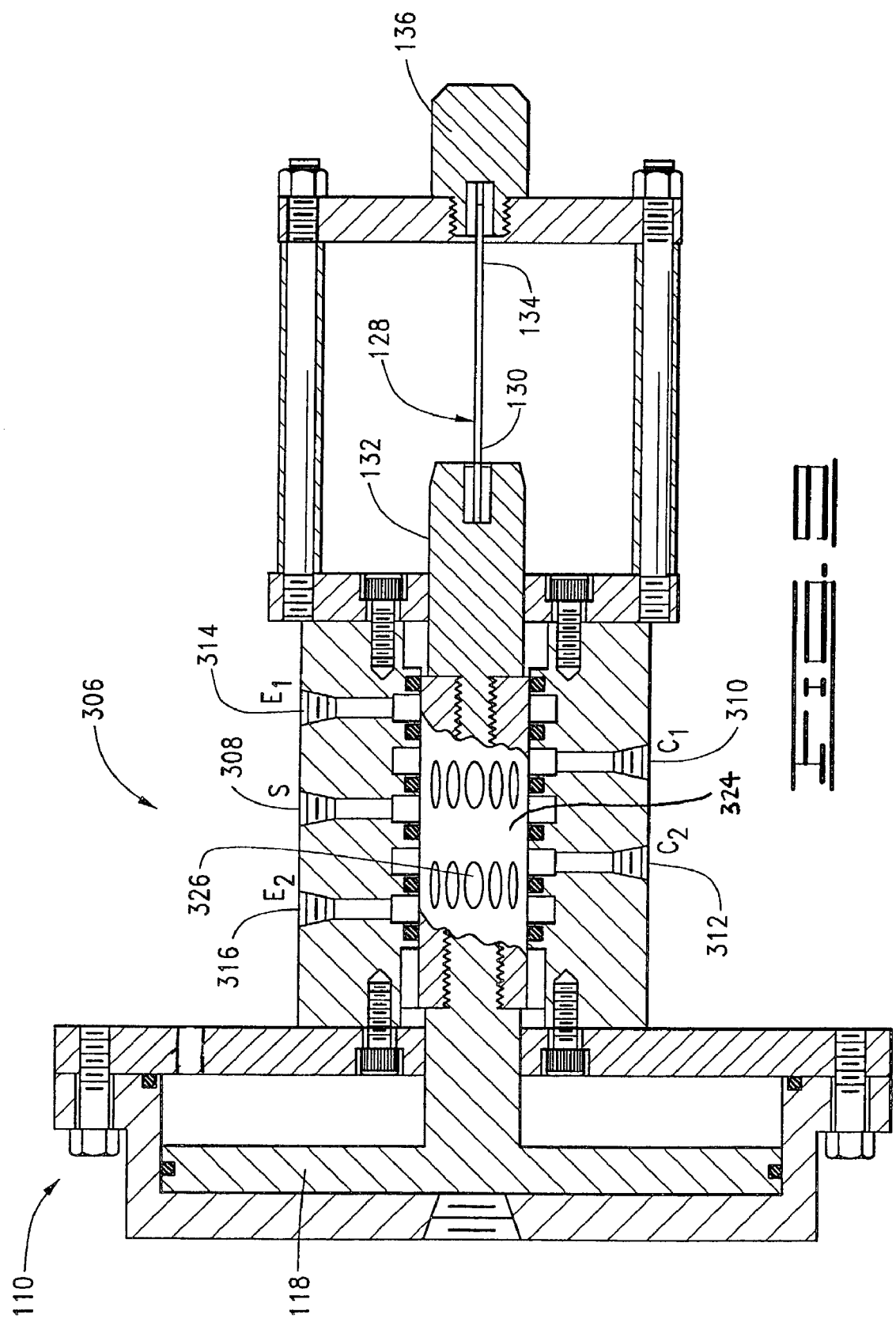

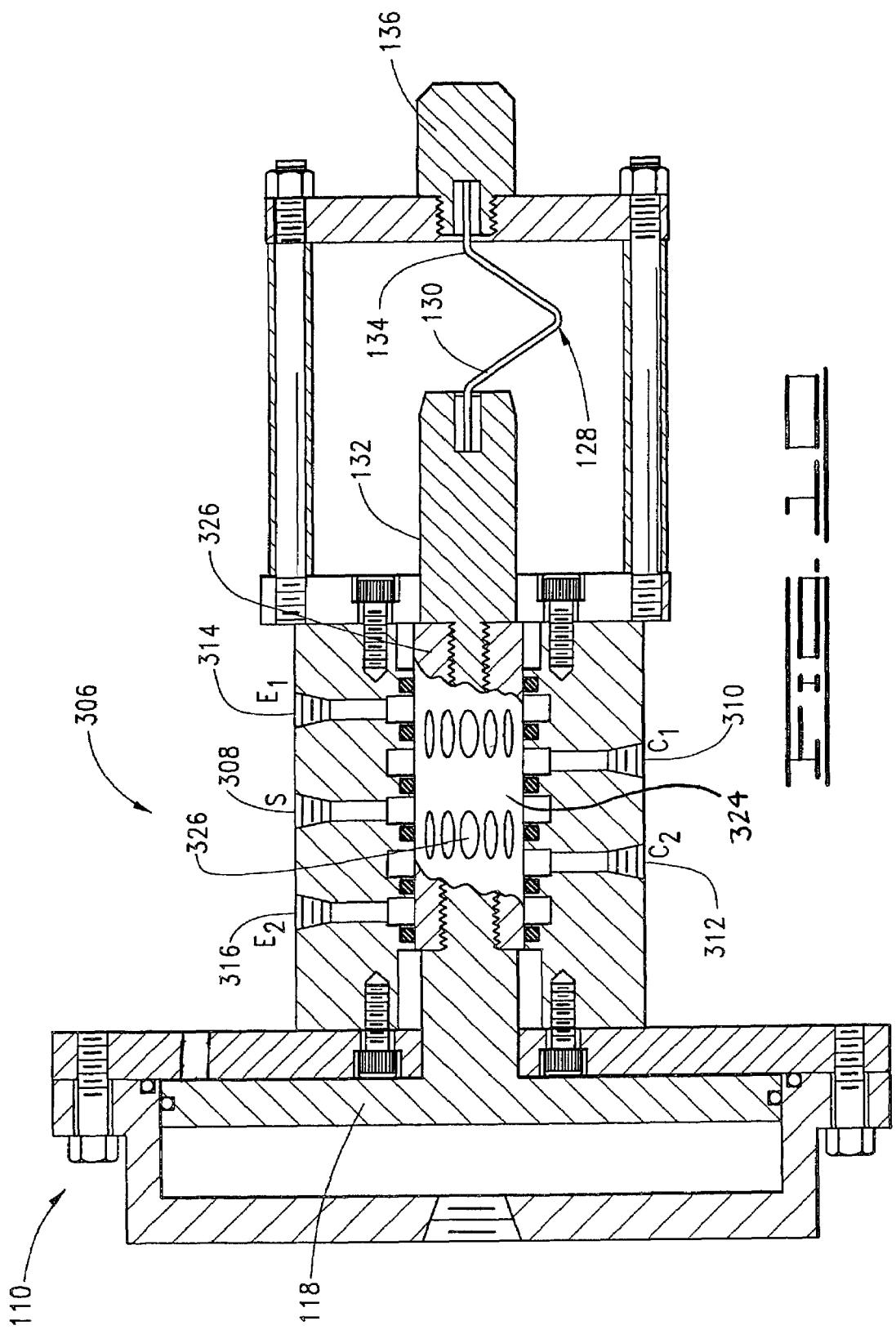

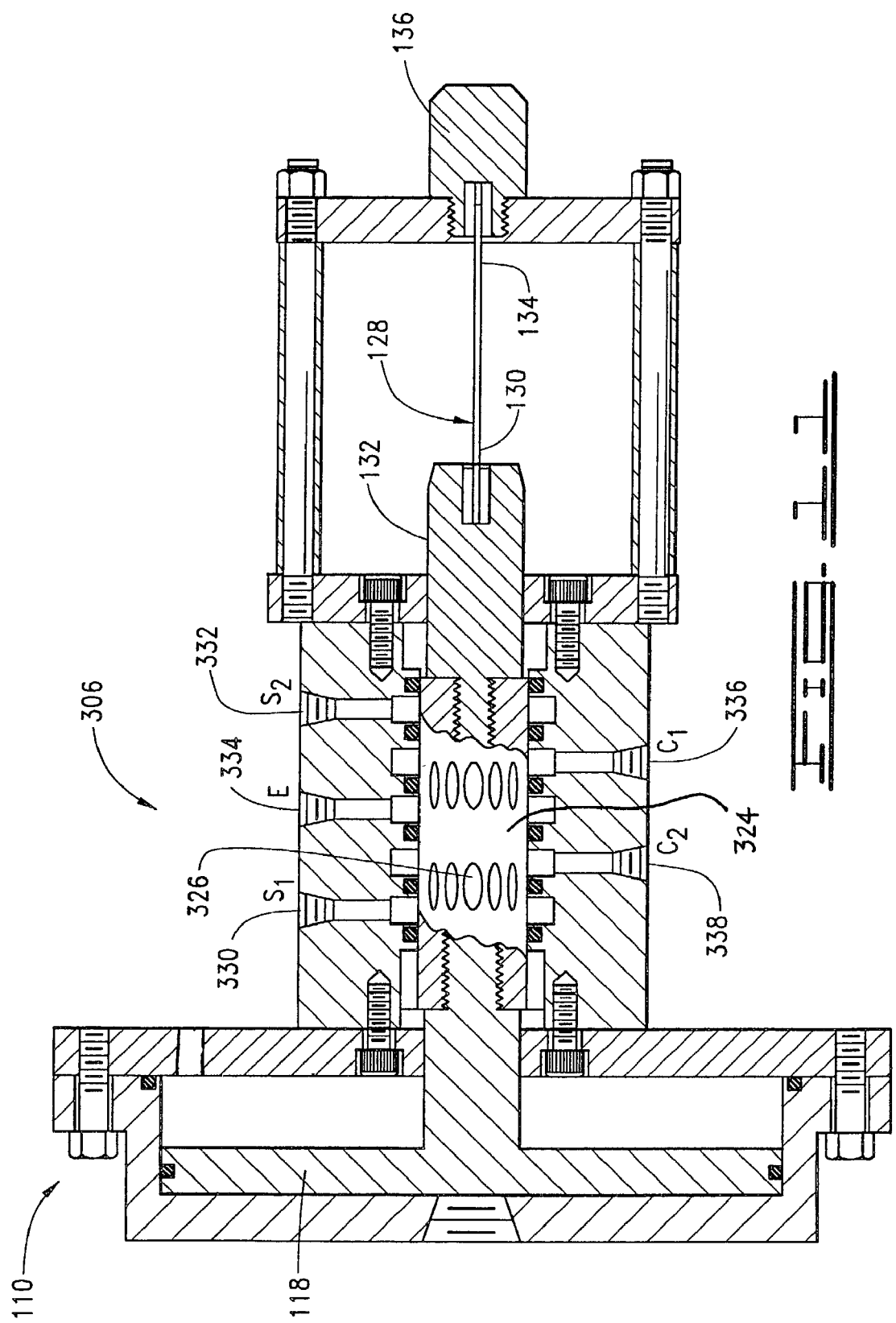

PRESSURE RELIEF SYSTEM WITH MULTI-PORT VALVE

FIELD OF THE INVENTION

The present invention relates generally to pressurized fluid systems and more particularly, but not by way of limitation, to a pressure relief system which uses a multi-port valve to detect and abate overpressure conditions in a pressurized fluid.

BACKGROUND

Pressurized fluid systems are typically provided with pressure relief capabilities to prevent the possibility of injury to humans and damage to equipment in the event of an overpressure situation. Such pressure relief systems often use a pressure responsive member that mechanically fails when subjected to a large increase in fluid pressure.

A particularly advantageous pressure relief system uses a buckling pin arrangement such as taught by U.S. Pat. No. 4,724,857 issued to Taylor. In such a system, the pin is placed under compressive load along an axial length of the pin by the pressure of the fluid. A sufficient increase in fluid pressure above a nominal operational level causes the pin to buckle, or collapse, allowing a plunger or other mechanism to move to a position where a bypass path can be established to direct the fluid to reduce the pressure to a safe operational level.

A valve can be advantageously configured to open or close in response to the collapse of a buckling pin. However, system forces can undesirably affect a threshold pressure level at which the pressure responsive member begins to fail. For example, friction forces and fluidic pressure can tend to offset the compressive load upon a buckling pin if the pin actuation and the valve are directly coupled.

There is therefore a continued need for improvements in the art to increase the accuracy and repeatability of pressure relief systems, and it is to such improvements that the present invention is directed.

SUMMARY OF THE INVENTION

A pressure relief system is provided to detect and abate an overpressure condition in a pressurized fluid. In accordance with preferred embodiments, the system includes a valve assembly connected to a conduit in which the pressurized fluid is disposed, and an actuator configured to actuate the valve assembly to establish an overpressure path for the pressurized fluid.

The system further preferably comprises a piston assembly which is also coupled to the conduit, a pressure responsive member (preferably a collapsible buckling pin) configured to mechanically fail when an axially directed compressive force exceeds a threshold level, and a multi-port, two-position valve disposed between the piston assembly and the pressure responsive member.

The multi-port, two-position valve includes a spool that moves from a first position to a second position upon failure of the pressure responsive member, thereby directing control fluid through the spool to the actuator assembly. The multi-port, two-position valve preferably comprises a five-port, two way valve comprising five ports which are interconnected in a first configuration when the spool is in the first position and which are interconnected in a second configuration when the spool is in the second position.

Preferably, at least one of the five ports is configured to vent previously supplied control fluid from the actuator assembly and through the spool when the spool is moved to the second position.

These and various other features and advantages which characterize the claimed invention will become apparent upon reading the following detailed description and upon reviewing the associated drawings.

BRIEF DESCRIPTION OF THE DRAWINGS

FIG. 8 is a schematic diagram of yet another pressure relief system constructed in accordance with preferred embodiments of the present invention and employing a five-port, two position valve.

FIG. 9 is an elevational, cross-sectional view of the five-port, two position valve of FIG. 8 in a first position.

FIG. 10 is an elevational, cross-sectional view of the valve of FIG. 8 in a second position.

FIG. 11 is an elevational, cross-sectional view of another five-port, two position valve in a first position.

DETAILED DESCRIPTION

Figure 1:
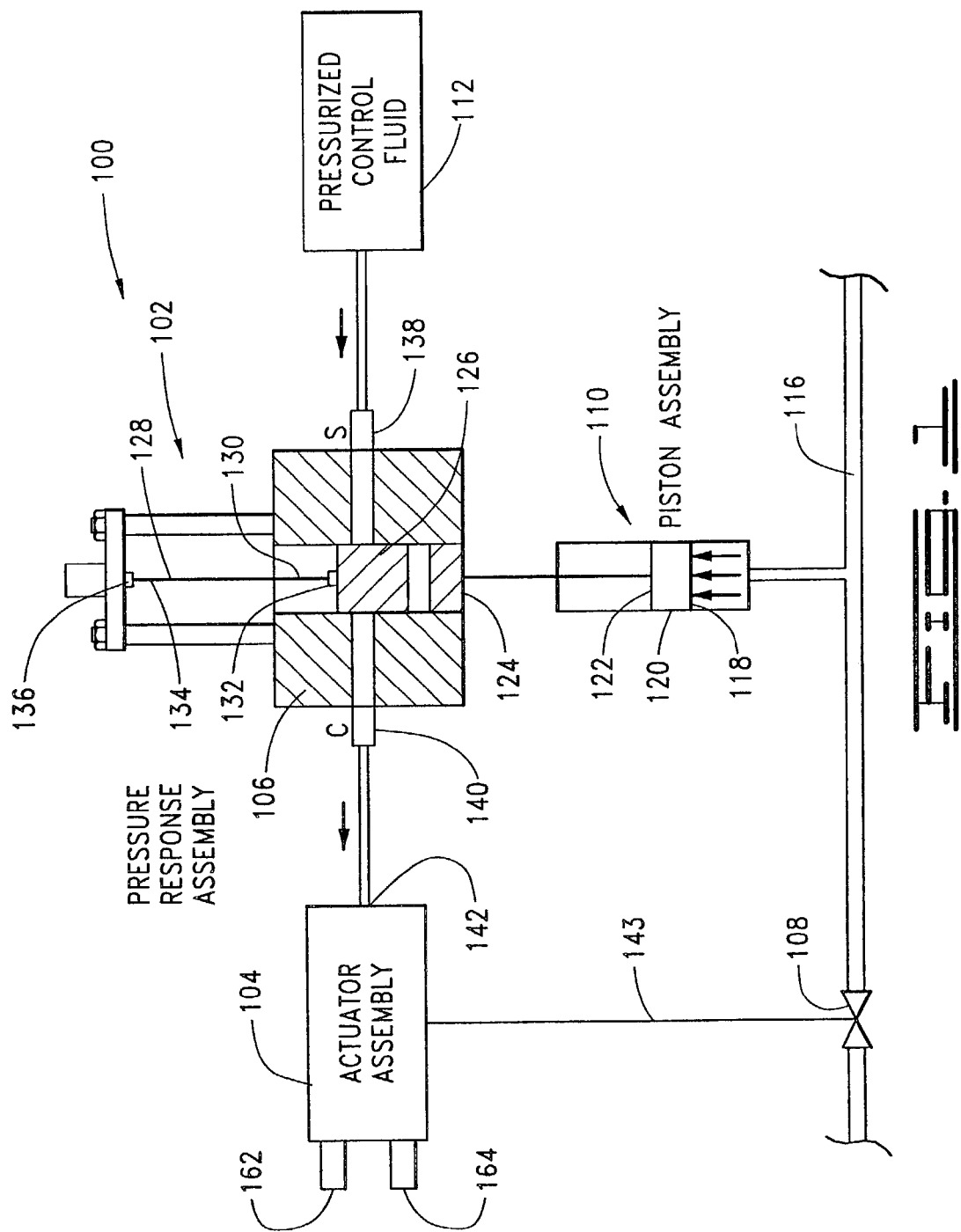
FIG. 1 is a schematic diagram of a pressure relief system constructed in accordance with preferred embodiments of the present invention, the pressure relief system in a steady state condition and employing a two-port, two-position valve.

FIG. 1 generally illustrates a pressure relief system 100 constructed in accordance with preferred embodiments of the present invention. The system 100 is preferably used as part of a larger pressurized fluid system in which a pressurized fluid is transported. The system 100 is used to detect an overpressure situation with the fluid and to provide an emergency overpressure path for the fluid to reduce the possibility of injury to humans and damage to equipment.

The system 100 is shown to generally include a pressure response assembly 102, an actuator assembly 104, a multi-port valve 106, a bypass valve assembly 108, a piston assembly 110, and a control fluid source 112. For the embodiments shown in FIGS. 1 and 2, the multi-port valve 106 is contemplated as comprising a two-port, two-position valve.

Pressurized fluid (also referred to herein as the "system fluid") is transported via a pipeline conduit 116 at a nominal pressure. A portion of the pressurized fluid is directed to the piston assembly 110 and imparts a force upon a first face 118 of a slidable piston 120. A second, opposing face 122 of the piston 120 is connected to a first end 124 of a valve spool 126.

The pressure response assembly 102 includes a pressure responsive member 128 configured to mechanically fail in response to the application of a selected force. The pressure responsive member is preferably characterized as a collapsible buckling pin, although other members can be used such as a shear pin or a frangible disk. The buckling pin 128 includes a first end 130 supported by a pin support 132 of the spool 126 and a second end 134 supported by a frame 136.

Figure 2:
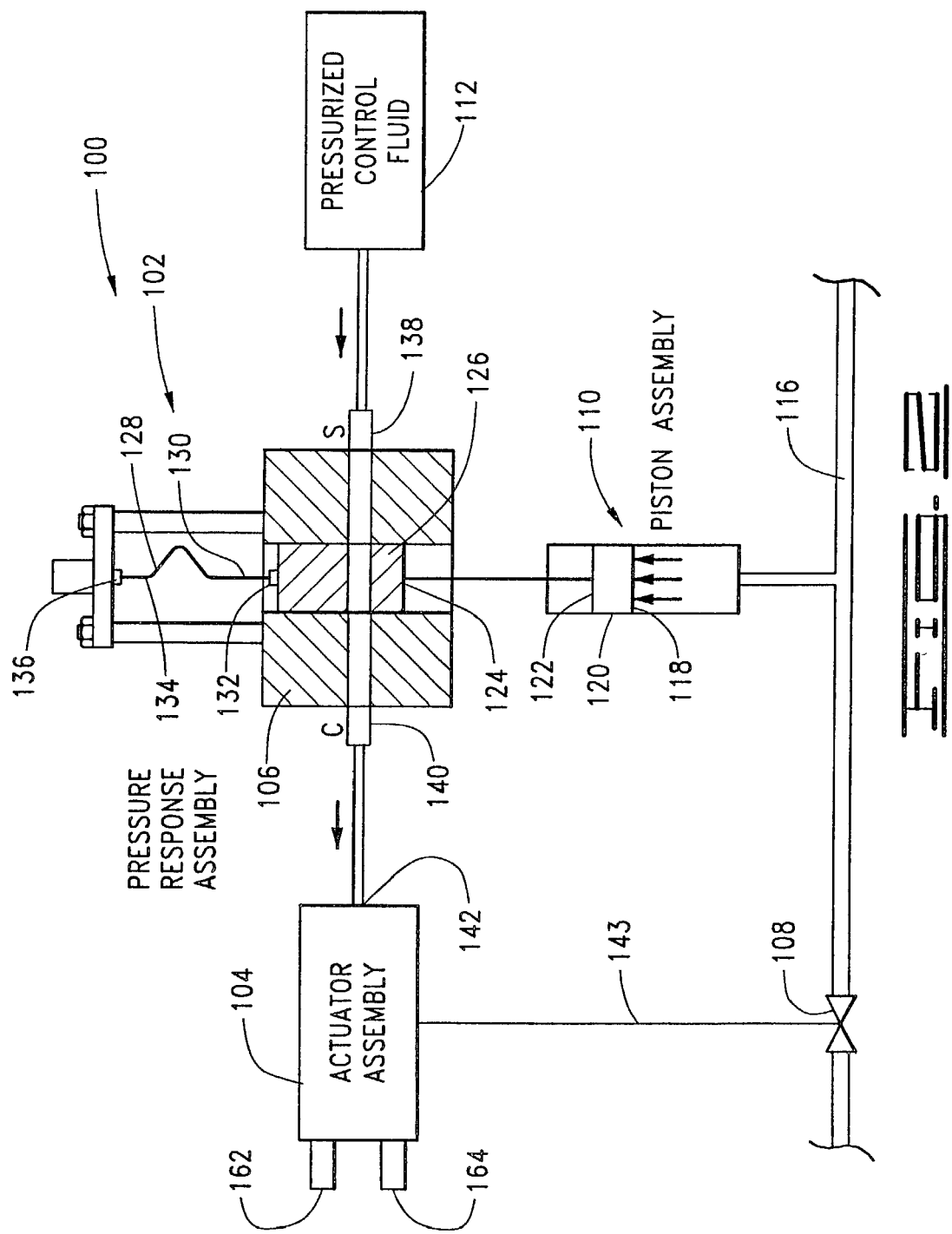
FIG. 2 is a schematic diagram of the pressure relief system in response to an overpressure condition.

At such time that the pressure of the system fluid rises above a selected threshold pressure PT greater than the normal operational pressure, the axial force exerted upon the buckling pin 128 (via the piston 120 and the spool 126) will exceed the buckling limit of the pin 128 and the pin 128 will mechanically fail (buckle), as represented in FIG. 2.

When the buckling pin 128 fails, the piston 120 moves and advances the valve spool 126 from a closed (first) position to an open (second) position. When the valve spool 126 moves to the open position, the control fluid from the source 112 flows through an inlet (supply, S) port 138 of the multi-port valve 106, through the valve spool 126, through an outlet (cylinder, C) port 140 and to the actuator assembly 104 via an actuator assembly inlet port 142.

The control fluid introduced to the actuator assembly 104 induces rotation in a shaft 143 to rotate the bypass valve assembly 108 to establish a secondary path for the system fluid. The control fluid from source 112 can comprise any suitable gaseous or liquid fluid, such as pressurized air.

Figure 3:
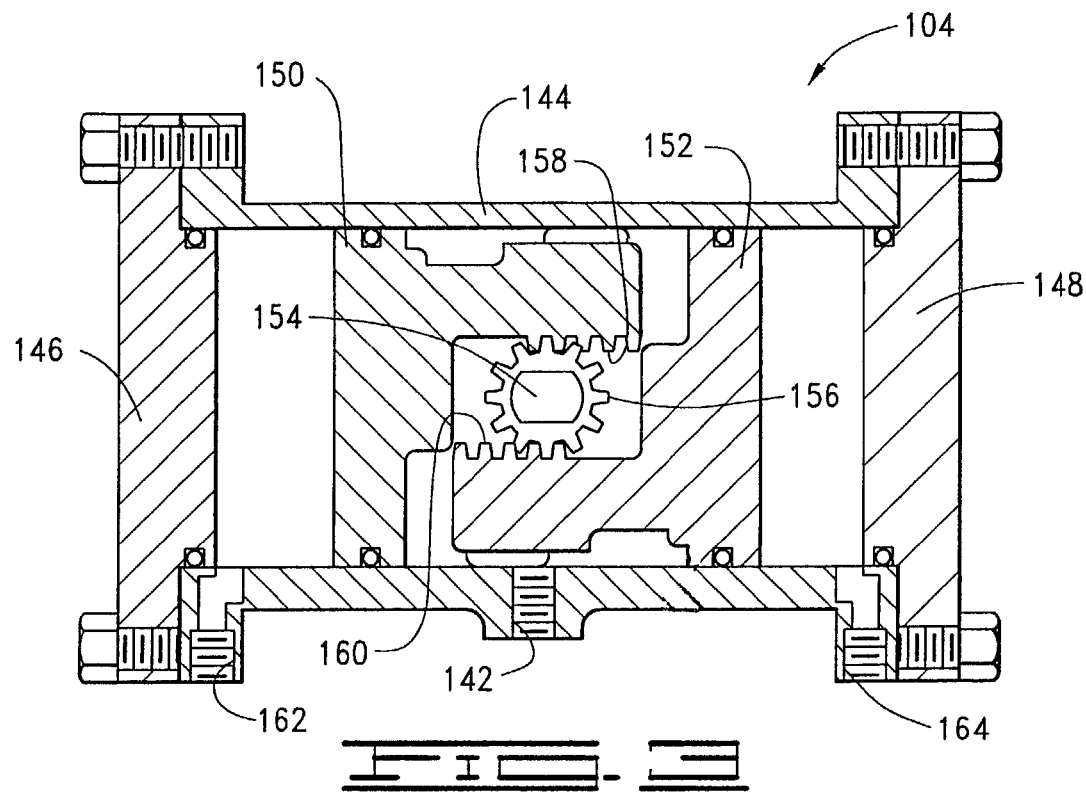
FIGS. 3 and 4 are cross-sectional views of an actuator assembly of the pressure relief system in the respective steady state and overpressure conditions of FIGS. 1 and 2.
Figure 4:
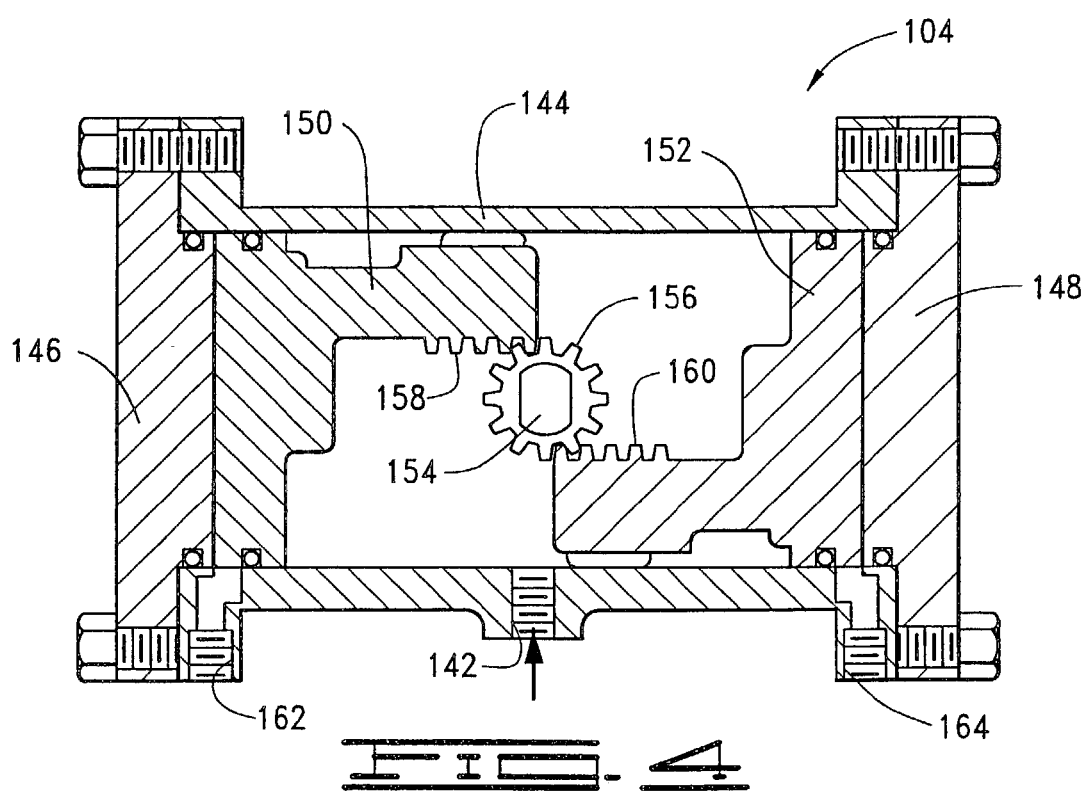

FIGS. 3 and 4 illustrate a preferred construction of the actuator assembly 104. A body portion 144 cooperates with flanges 146, 148 to provide a sealed actuator assembly housing. The pressurized control fluid enters the actuator assembly housing between a pair of opposed actuator pistons 150, 152 via the actuator assembly inlet 142. The pistons 150, 152 are disposed within the housing and are configured for movement toward opposing ends of the housing. An actuator shaft 154 is transversely mounted by the body portion 144 and supports a pinion 156 (elongated rotary gear) which engages racks 158, 160 (teeth) in the respective pistons 150, 152.

When the pressurized control fluid enters the actuator assembly housing, the pressure of the fluid causes the pistons 150, 152 to move from a retracted position as shown in FIG. 3 to an extended position as shown in FIG. 4. The movement of the pistons 150, 152 induces torque in the actuator shaft 154 as a result of engagement of the racks 158, 160 and the pinion 156. The actuator shaft 154 is coupled to the valve shaft 143 so that the valve assembly 108 is opened or closed when the actuator shaft 154 rotates. Vent ports 162, 164 allow atmospheric air within the housing to escape as the actuator assembly 104 moves to the extended position.

In general, valve assemblies such as shown at 108 are not frictionless systems. In order to move the valve assembly 108 between the open position and the closed position, significant amounts of force may be required to overcome reactive forces, such as stiction force (i.e., force resisting initial movement of the valve) and function force (i.e., force resisting continued movement of the valve after the initial movement). One source of these reactive forces is the seal assemblies used to maintain an adequate seal against the fluid pressure about the valve.

Another source of reactive forces is the pressure of the fluid upon the various surfaces of the valve as the valve is rotated. The valve variably restricts a flow stream of the fluid. The pressure of the fluid varies as the valve is placed at intermediate positions between the open and closed positions, and this can impart significant resistance to the rotation of the valve. Thus, making the pressure response assembly 102 initially independent from the actuator assembly 104 advantageously prevents the stiction and friction forces of the valve assembly 108 from affecting the operation of the pressure response assembly 102.

Figure 5:
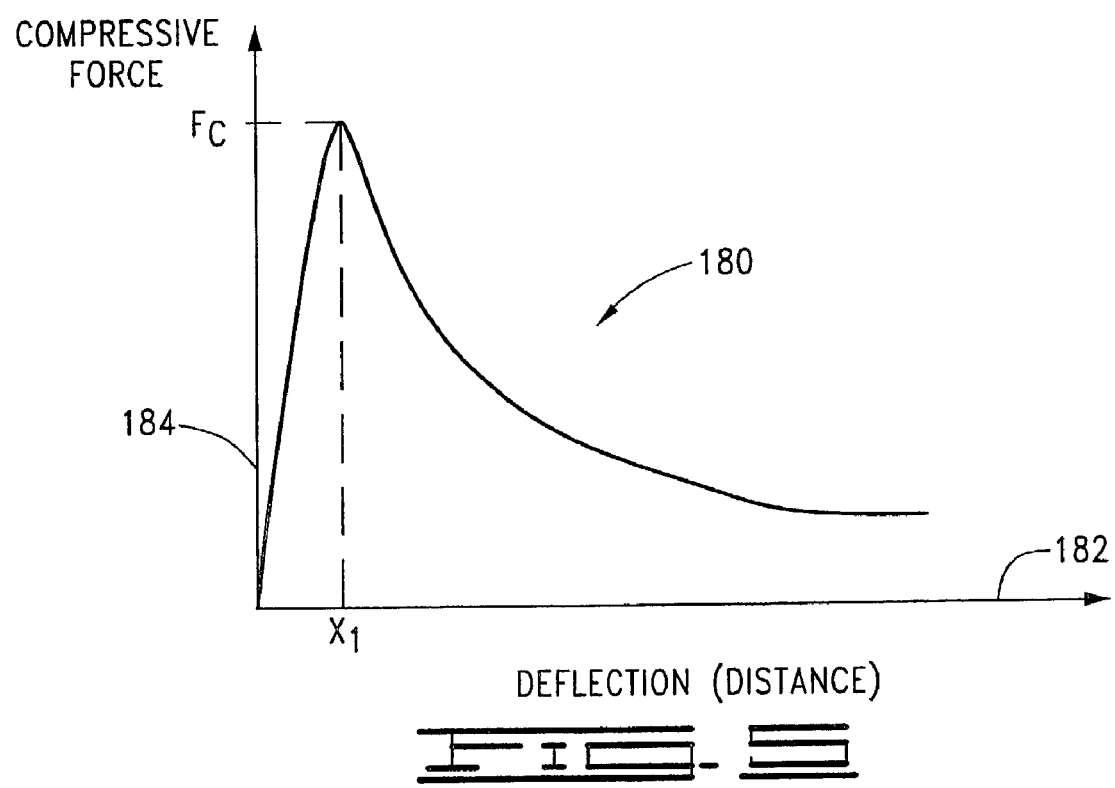
FIG. 5 is a graphical illustration of a force versus deflection curve to generally illustrate force required to deflect and ultimately collapse a buckling pin of the system of FIG. 1.

Another related advantage to making the pressure response assembly 102 independent from the actuator assembly 104 relates to the manner in which a typical buckling pin collapses. FIG. 5 provides a generalized graphical representation of a buckling pin deflection curve 180 plotted against a deflection distance x-axis 182 and a compressive force magnitude y-axis 184. Forces below a critical force Fc allow the buckling pin 128 to remains within its elastic limit; thus, increases in compressive force up to the critical force Fc will impart a slight bowing to the buckling pin 128, but a relaxation of the compressive force will allow the buckling pin 128 to return to the original straight configuration.

However, once the critical force Fc is reached (i.e., axial deflection reaches a distance X1), the buckling pin 128 begins to buckle. The amount of force thereafter required to continue buckling of the pin is not constant, but drops off rapidly as shown by curve 180. Hence, instituting a short time delay before engagement of the valve assembly 108 upon pin failure advantageously allows the pressurized fluid to initiate compression of the pin 128 without being hindered by opposing forces from the valve assembly 108. This time delay is inherent in the system because it takes some finite time for the piston 120 to move the valve spool 126 to the open position.

Figure 6:
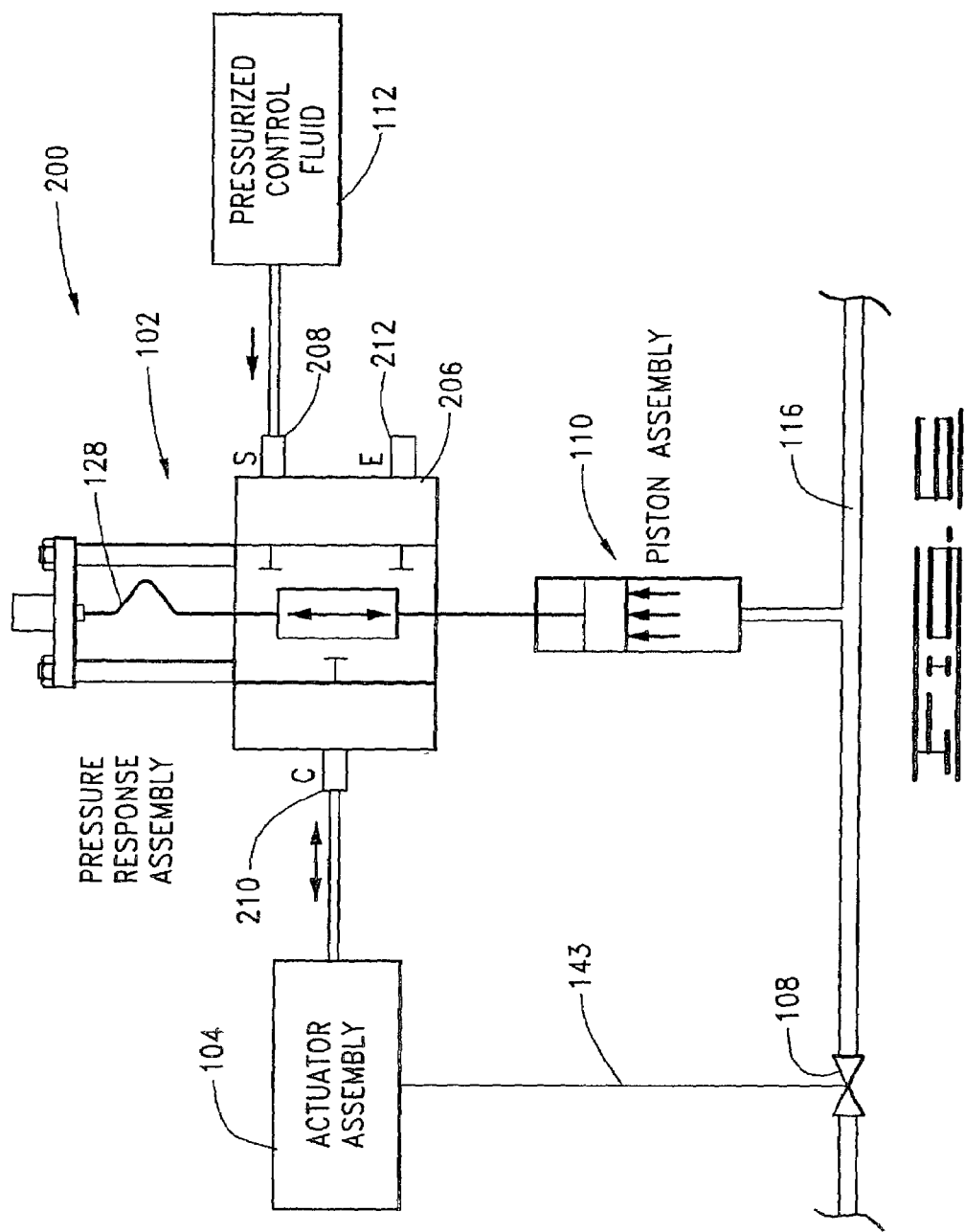
FIG. 6 is a schematic diagram of an alternative pressure relief system constructed in accordance with preferred embodiments of the present invention and employing a three-port, two position valve.

FIG. 6 provides another pressure relief system 200 similar to the pressure relief system 100 discussed above, generally except for the use of a multi-port valve 206 comprising a three-port, two-position valve. Similar components in FIG. 6 to those shown in FIGS. 1 and 2 have been provided with like reference numerals.

The three ports of the valve 206 include a supply (S) port 208, a cylinder (C) port 210 and an exhaust (E) port 212. The C port 210 is in communication with the E port 212 during normal, steady state operation.

Upon mechanical failure of the buckling pin 128, the valve 206 moves to the second position and control fluid passes from the source 112, through the S port 208, through the valve 206, through the C port 210, and to the actuator assembly 104. Application of the control fluid to the actuator assembly 104 in this manner results in the operation of the valve assembly 108 to establish the secondary path for the system fluid in the conduit 116, as before.

However, once the valve 206 is reset to the first position, the C port 210 is once again placed into communication with the E port 212 and the pressurized control fluid from the actuator assembly 104 is exhausted (vented) through the valve 206. The vented control fluid from the E port 212 can be exhausted to the atmosphere (as in the case of pressurized air) or can be returned to the pressurized fluid source 112. Once the actuator assembly 104 is depressurized, the valve 108 and the actuator assembly 104 are returned to the original retracted state (as shown in FIG. 3) through manual or automated operation.

Figure 7:
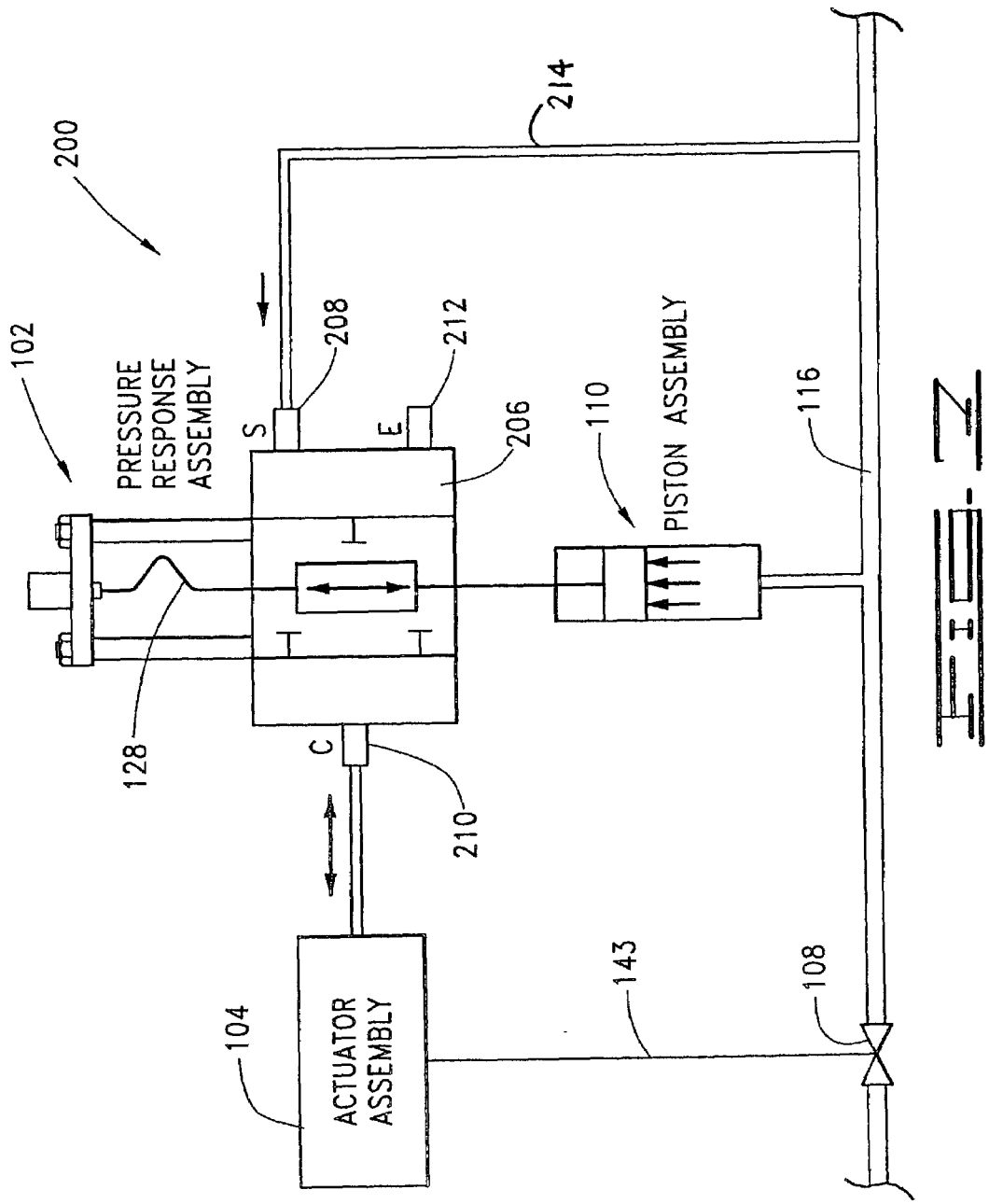
FIG. 7 is a schematic diagram of another alternative pressure relief system constructed in accordance with preferred embodiments of the present invention employing a three-port, two position valve.
Figure 7:
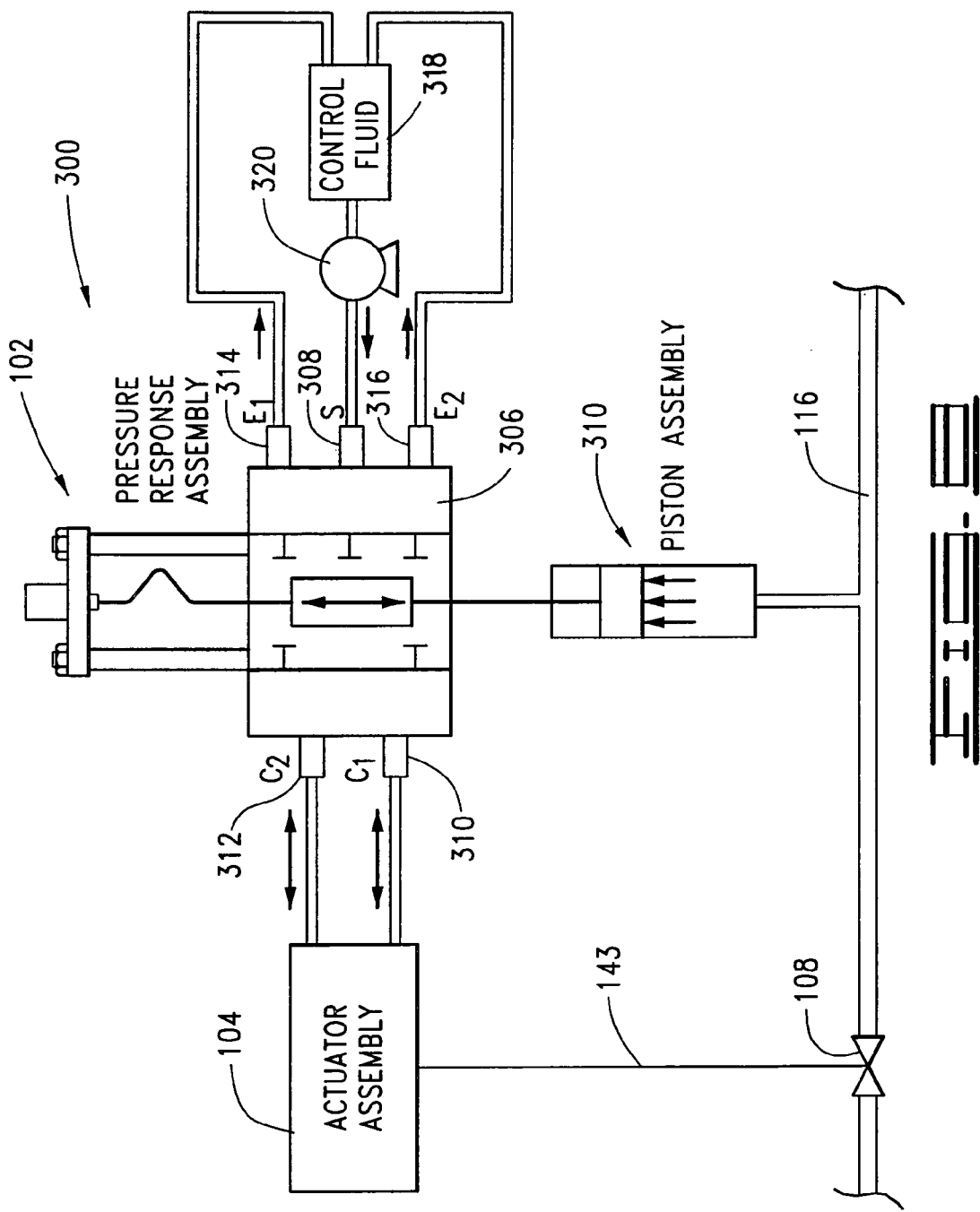

FIG. 7 shows an alternative configuration for the system of FIG. 6. FIG. 7 likewise uses the three-way, two-position valve 206 discussed above, but the control fluid comprises a portion of the system fluid diverted from the conduit 116 via conduit 214. In this case suitable equipment (condenser, etc. not shown) would be useful in many applications to return the spent control fluid from exhaust E port 212 back to the main flow of the system fluid.

FIG. 8 provides yet another alternative construction for a pressure relief system 300, generally similar to those discussed above. The system 300 of FIG. 8 uses a multi-port valve 306 comprising a five-way, two-position valve. A suitable commercially available embodiment of the five-way, two-position valve 306 is the Model R04 Air or Gas General Purpose Valve provided by AAA Products International, Dallas, Tex., USA.

The valve 306 includes a supply S port 308, two cylinder (C1, C2) ports 310, 312 and two exhaust (E1, E2) ports 314, 316. The S port 308 receives pressurized control fluid from a source 318 (such as a tank or reservoir) via pump 320. The C2 port 312 is connected to the actuator inlet port 142 (FIG. 3) and the C1 port 310 is connected to the respective actuator assembly outlet ports 162, 164 (FIG. 3). The E1 and E2 exhaust ports 314, 316 are shown as returning to the source 318, but in suitable applications can also be directly vented to the atmosphere.

During steady state operation, the supply S port 308 is preferably placed in fluidic communication with the C1 port 310, so that pressurized fluid is provided into the actuator assembly 104 in the volumes of space outside the pistons 150, 152 and between the pistons and the the flanges 146, 148 as shown in FIG. 3 (this space is collectively referred to as "cylinder 1").

At this time the C2 port 312 is in communication with the E2 exhaust port 316 so that fluid within the actuator assembly 104 in the volume of space between the pistons 150, 152 (FIG. 3) is substantially at atmospheric pressure (this space is collectively referred to as "cylinder 2"). This configuration of the multi-port valve 306 is shown in FIG. 9.

As shown in FIG. 9, the valve 306 includes a spool 324 with radially arranged indentations 326 which allow internal communication between the various ports. It will be noted from FIG. 9 that the E1 exhaust port 314 is blocked by a sidewall of the spool 324 when the spool 324 is in the first position (i.e., during steady state operation with the buckling pin 128 in an uncollapsed condition).

Upon failure of the buckling pin 128, the valve 306 moves to the second position which places the S port 308 in communication with the C2 port 312 and the C1 port 310 in communication with the E1 port 314. This configuration of the valve 306 is shown in FIG. 10 and results in the flow of control fluid from the source 312 to cylinder 2 (between the pistons 150, 152 in FIG. 3) and the venting of previously provided control fluid from cylinder 1 (beyond the pistons 150, 152).

As the control fluid enters cylinder 2 in this manner, the pistons 150, 152 are moved apart to the orientation shown in FIG. 4 and the valve 108 is activated as discussed above to establish the secondary path for the system fluid. Upon subsequent resetting of the system, the process works in reverse order; pressurized control fluid is once again applied to cylinder 1, the existing control fluid in cylinder 2 is vented (via E2 port 316) and the valve assembly 108 is returned to the steady state condition. An advantage of this configuration is the pressurized control fluid can be used to move the valve assembly 108 to both operational positions.

FIG. 11 shows the valve 306 in accordance with a different port configuration. More particularly, the valve 306 is provided with two supply (S1, S2) ports 330, 332, an exhaust (E) port 334 and two cylinder (C1, C2) ports 336, 338. As before, the C1 port 336 is connected to the respective actuator assembly outlet ports 162, 164 (FIG. 3) and the C2 port 338 is connected to the actuator assembly inlet port 142 (FIG. 3).

Figure 12:
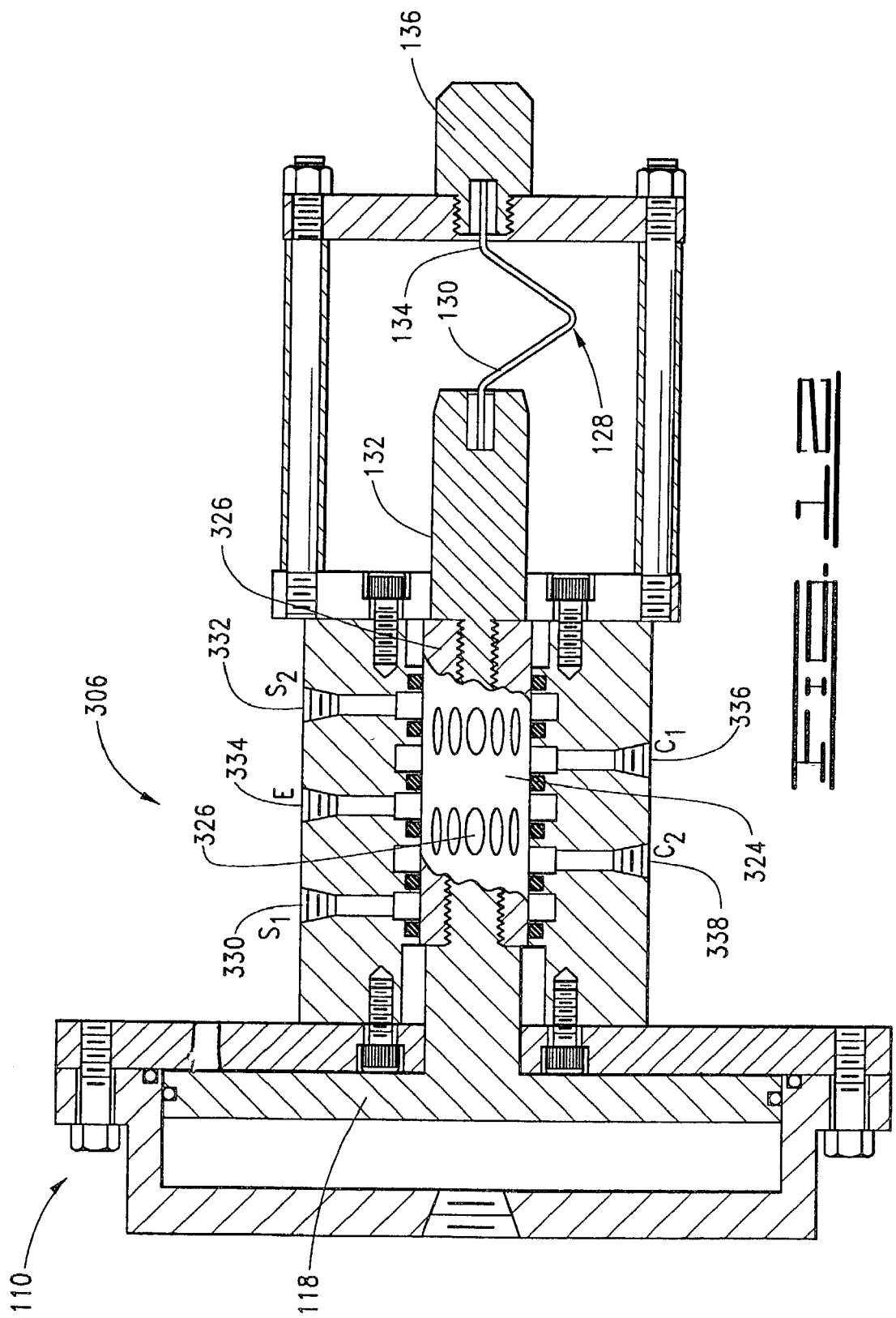
FIG. 12 is an elevational, cross-sectional view of the valve of FIG. 11 in a second position.

The S1, S2 ports 330, 332 are connected to a single source or separate sources (not shown) of the pressurized control fluid. As before, the exhaust E port 334 can be vented directly to the atmosphere or returned to the source(s) of the pressurized control fluid. FIG. 12 shows the valve 306 with the spool 324 in the second position.

It will now be understood that the present invention (as embodied herein and as claimed below) is generally directed to a pressure relief system to detect and abate an overpressure situation in a pressurized fluid.

In accordance with preferred embodiments, the system (such as 100, 200, 300) includes a valve assembly (such as 106) connected to a conduit (such as 116), and an actuator assembly (such as 104) configured to actuate the valve assembly to establish an overpressure path for the pressurized fluid.

The system further preferably comprises a piston assembly (such as 110) which is also coupled to the conduit, a pressure responsive member (preferably a collapsible buckling pin such as 128) configured to mechanically fail when an axially directed compressive force exceeds a threshold level, and a multi-port, two-position valve (such as 106, 206, 306) disposed between the piston assembly and the pressure responsive member.

The multi-port, two-way valve includes a spool (such as 126, 324) that moves from a first position to a second position upon failure of the pressure responsive member, thereby directing control fluid through the spool to the actuator assembly. The multi-port, two-way valve preferably comprises a five-port, two way valve comprising five ports (such as 308, 310, 312, 314, 316 in FIGS. 9 and 10 and such as 330, 332, 334, 336, 338 in FIGS. 11 and 12) which are interconnected in a first configuration when the spool is in the first position and which are interconnected in a second configuration when the spool is in the second position.

Preferably, at least one of the five ports (such as 314, 316 in FIGS. 9 and 10 and such as 334 in FIGS. 11 and 12) is configured to vent previously supplied control fluid from the actuator assembly and through the spool when the spool is moved to the second position.

For purposes of the appended claims, mechanical failure will be understood as describing, for example, the buckling of a buckling pin such as 128, the shearing of a shear pin, or the bursting of a disc membrane. Overpressure path will be understood to describe a redirection of the flow of the pressurized fluid, such as by a bypass path (as shown in FIG. 2) or a shutdown (interruption) in the original flow. Other piston-shaft coupling arrangements besides a rack and pinion arrangement to generate a torque are readily contemplated and are well within the ability of those skilled in the art to implement, such as configurations using belts, springs, chain drives, or linkages.

In the appended claims, the recited first means for actuating will be understood as corresponding to the disclosed actuator assembly 104. The recited second means for applying and for directing will be understood as corresponding to the disclosed piston assembly 10 and the multi-port valves 106, 206 and 306.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A pressure relief system to detect and abate an overpressure condition of a pressurized fluid disposed in a conduit, comprising:
   a valve assembly coupled to the conduit;
   an actuator configured to actuate the valve assembly to establish an overpressure path for the pressurized fluid;
   a piston assembly coupled to the conduit;
   a pressure responsive member configured to mechanically fail when the pressure of the pressurized fluid exceeds a threshold pressure; and
   a multi-port valve disposed between the piston assembly and the pressure response assembly and comprising a spool that moves from a first position to a second position upon failure of the pressure responsive member, wherein the movement of the spool to the second position causes control fluid to flow through the spool to the actuator assembly which in turn actuates the valve assembly to establish said overpressure path.

2. The pressure relief system of claim 1 wherein the spool comprises a first end connected to the piston assembly and an opposing second end connected to the pressure responsive member.

3. The pressure relief system of claim 2 wherein the piston assembly comprises a piston having a front face in contact with the pressurized fluid from the conduit and a rear face rigidly connected to the first end of the spool.

4. The pressure relief system of claim 2 wherein the multi-port valve is a five-port, two-position valve comprising five ports which are respectively interconnected in a first configuration when the spool is in the first position and which are respectively interconnected in a different, second configuration when the spool is in the second position.

5. The pressure relief system of claim 4 wherein at least a selected one of the five ports of the multi-port valve comprises an exhaust port to vent previously supplied control fluid from the actuator assembly.

6. The pressure relief system of claim 5 wherein the previously supplied control fluid vented by the exhaust port is exhausted to the atmosphere.

7. The pressure relief system of claim 1 wherein the control fluid is provided from a control fluid source.

8. The pressure relief system of claim 1 further comprising a control fluid pressurizer which pressurizes the control fluid.

9. The pressure relief system of claim 1 wherein the pressure responsive member comprises a collapsible buckling pin.

10. The pressure relief system of claim 1, wherein the control fluid comprises pressurized air.

11. The pressure relief system of claim 1 wherein the control fluid comprises a portion of the pressurized fluid.

12. A pressure relief system to detect and abate an overpressure condition of a pressurized fluid disposed in a conduit, comprising:
   a valve assembly coupled to the conduit;
   first means for actuating the valve assembly to establish an overpressure path for the pressurized fluid;
   a pressure responsive member configured to mechanically fail when an axially directed compressive force applied to the pressure responsive member exceeds a threshold force; and
   second means for applying a selected axially directed compressive force upon the pressure responsive member in relation to a pressure of the pressurized fluid and for directing a control fluid to the first means to activate the valve assembly when the selected axially directed compressive force exceeds the threshold force.

13. The pressure relief system of claim 12, wherein the first means comprises a rotary actuator assembly comprising at least one slidable piston which engages a pinion gear to establish rotation of a shaft, wherein said rotation of the shaft actuates the valve assembly to establish the overpressure path for the pressurized fluid.

14. The pressure relief system of claim 12, wherein the second means comprises:
   a piston assembly comprising a piston movable within a housing, the piston having a first face in communication with the pressurized fluid from the conduit and an opposing, second face; and
   a multi-port valve disposed between the piston assembly and the pressure response assembly and comprising a spool having a first end connected to the second face of the piston assembly and an opposing, second end connected to the pressure responsive member, the spool moving from a first position to a second position upon failure of the pressure responsive member, wherein the movement of the spool to the second position causes the control fluid to flow through the spool to the first means.

15. The pressure relief system of claim 14, wherein the multi-port valve is characterized as a five-port, two-position valve comprising five ports which are respectively interconnected in a first configuration when the spool is in the first position and which are respectively interconnected in a different, second configuration when the spool is in the second position.

16. The pressure relief system of claim 15, wherein at least a selected one of the five ports of the multi-port valve comprises an exhaust port to vent previously supplied control fluid from the actuator assembly through the spool.

17. The pressure relief system of claim 15, wherein the previously supplied control fluid vented by the exhaust port is exhausted to the atmosphere.

18. The pressure relief system of claim 12, wherein the pressure responsive member comprises a collapsible buckling pin.

19. The pressure relief system of claim 12, wherein the control fluid comprises pressurized air.

20. The pressure relief system of claim 12, wherein the control fluid comprises a portion of the pressurized fluid.

* * * * *